(12) United States Patent
Kitajima et al.

(10) Patent No.: US 8,423,491 B2
(45) Date of Patent: Apr. 16, 2013

(54) COMPUTER PROGRAM PRODUCT, METHOD, AND APPARATUS FOR CALCULATING RELIABILITY OF AN APPLICATION PROCEDURE FOR FRAUD USING AN ESTIMATED PROBABILITY OF DETECTION OF FRAUD

(75) Inventors: Hironobu Kitajima, Kawasaki (JP); Ryo Ochitani, Kawasaki (JP); Morio Ikesaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1156 days.

(21) Appl. No.: 12/081,694

(22) Filed: Apr. 18, 2008

(65) Prior Publication Data

US 2008/0262794 A1    Oct. 23, 2008

(30) Foreign Application Priority Data

Apr. 19, 2007    (JP) .................. 2007-110628

(51) Int. Cl.
    *G06F 17/00*    (2006.01)
(52) U.S. Cl.
    USPC ........................................................... 706/45
(58) Field of Classification Search .............. 706/12, 706/45, 62
    See application file for complete search history.

(56) References Cited

U.S. PATENT DOCUMENTS

| | | | | |
|---|---|---|---|---|
| 6,028,998 A * | 2/2000 | Gloudeman et al. | ........... | 717/108 |
| 6,119,125 A * | 9/2000 | Gloudeman et al. | .................. | 1/1 |
| 7,006,977 B1 * | 2/2006 | Attra et al. | .................... | 705/313 |
| 7,426,454 B2 * | 9/2008 | Mertins et al. | .................... | 703/1 |
| 7,502,768 B2 * | 3/2009 | Ahmed et al. | .................. | 706/21 |
| 2003/0088510 A1 | 5/2003 | Yokota et al. | | |
| 2007/0283206 A1 | 12/2007 | Kitajima et al. | | |
| 2008/0015823 A1 * | 1/2008 | Arnold et al. | ..................... | 703/1 |
| 2008/0059220 A1 * | 3/2008 | Roth et al. | ......................... | 705/1 |
| 2008/0168021 A1 | 7/2008 | Kitajima et al. | | |

FOREIGN PATENT DOCUMENTS

| | | |
|---|---|---|
| JP | 7-200534 | 8/1995 |
| JP | 2002-072876 | 3/2002 |
| JP | 2003-141349 | 5/2003 |
| JP | 2007-305066 | 11/2007 |
| JP | 2008-171037 | 7/2008 |

OTHER PUBLICATIONS

Japanese Office Action mailed Nov. 22, 2011 issued in corresponding Japanese Patent Application No. 2007-110628.

* cited by examiner

*Primary Examiner* — David Vincent
(74) *Attorney, Agent, or Firm* — Fujitsu Patent Center

(57) ABSTRACT

Information of an action of fact confirmation performed between nodes that are objects relating to fact confirmation in an application procedure is read from a predetermined storage unit that previously stores whether an action of fact confirmation is an action of operating information or an action of confirming information, and based on the read information of the action, when a fraud is committed in an action of operating information, reliability of the application procedure is calculated based on a probability of a detection of a fraud in an action of confirming information performed in a node connected to the action of operating information.

9 Claims, 18 Drawing Sheets

| FRAUD PATTERN | FRAUD | SUCCESS RATE (B) OF FRAUD PATTERN | ALL PASS RATE (T) | FRAUD DETECTION RATE (D) |
|---|---|---|---|---|
| #1 | SUCCESS | 1-p5 | 1-p2 | p5+(1-p5)p2 |
| #2 | SUCCESS | 1-p1 | 1-p2 | p1+(1-p1)p2 |
| #3 | FAILURE | 1-p6 | (1-p2)(1-p4) | p6+(1-p6){1-(1-p2)(1-p4)} |
| #4 | SUCCESS | 1-p3 | 1-p4 | p3+(1-p3)p4 |
| #5 | SUCCESS | 1-p7 | 1-p4 | p7+(1-p7)p4 |

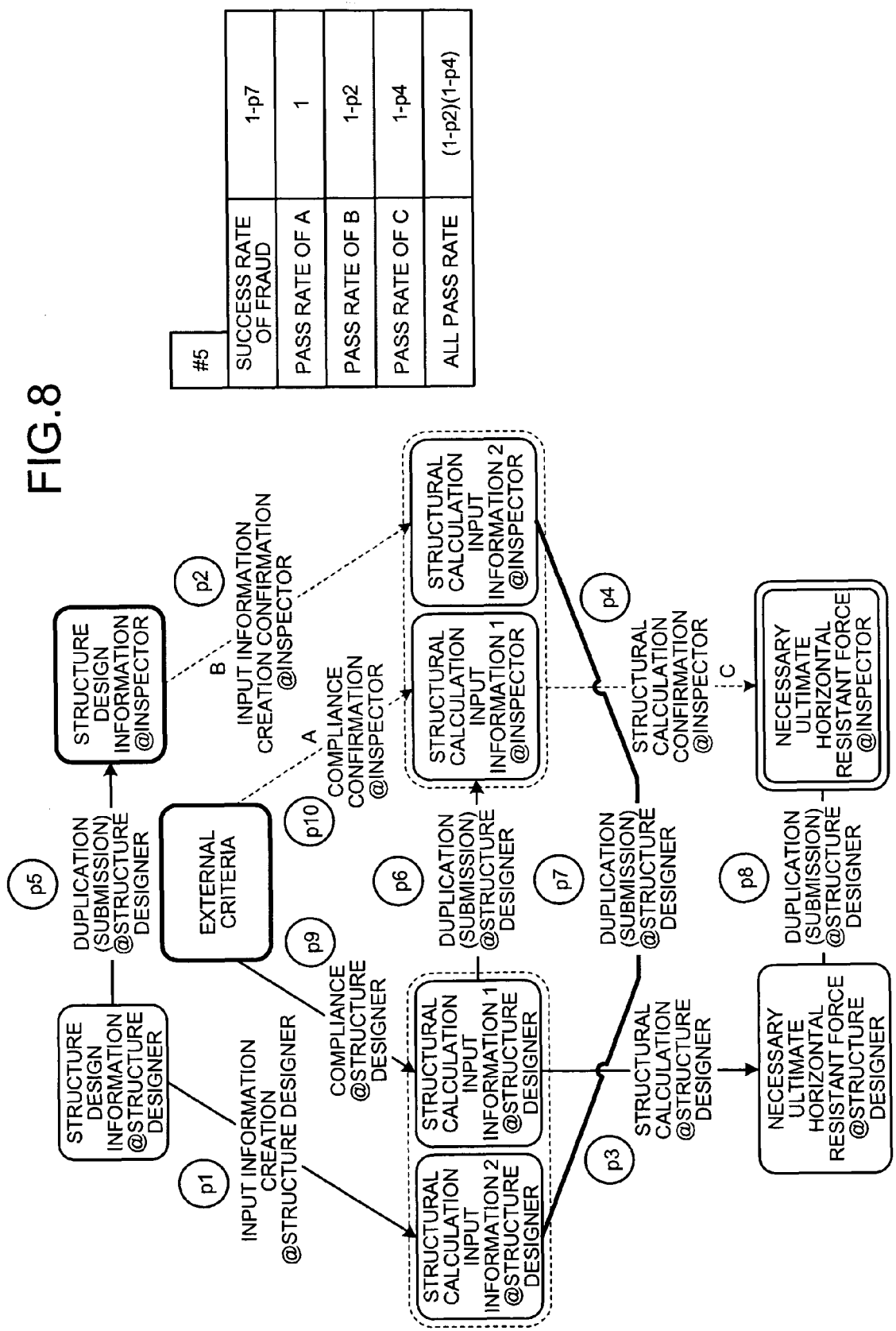

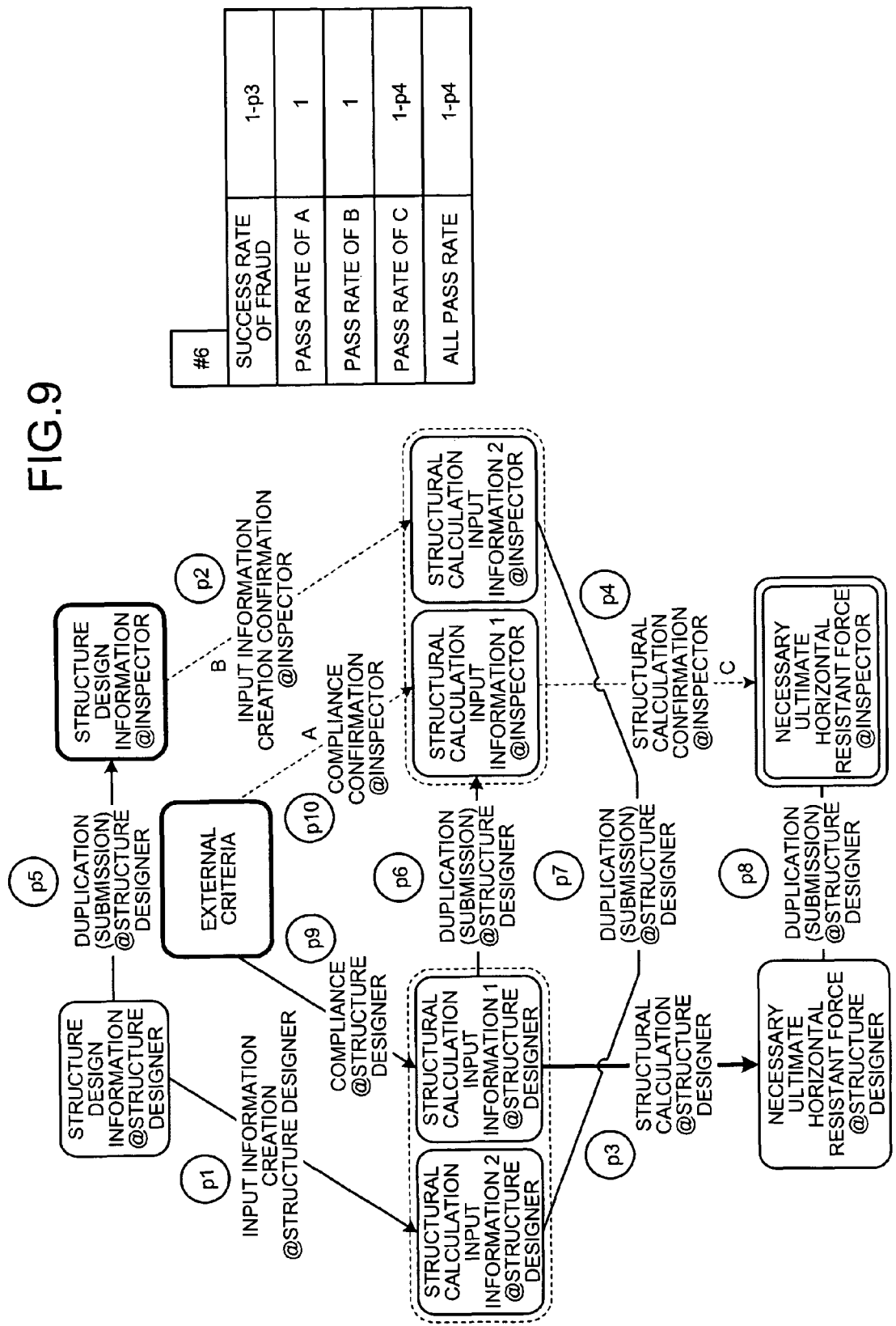

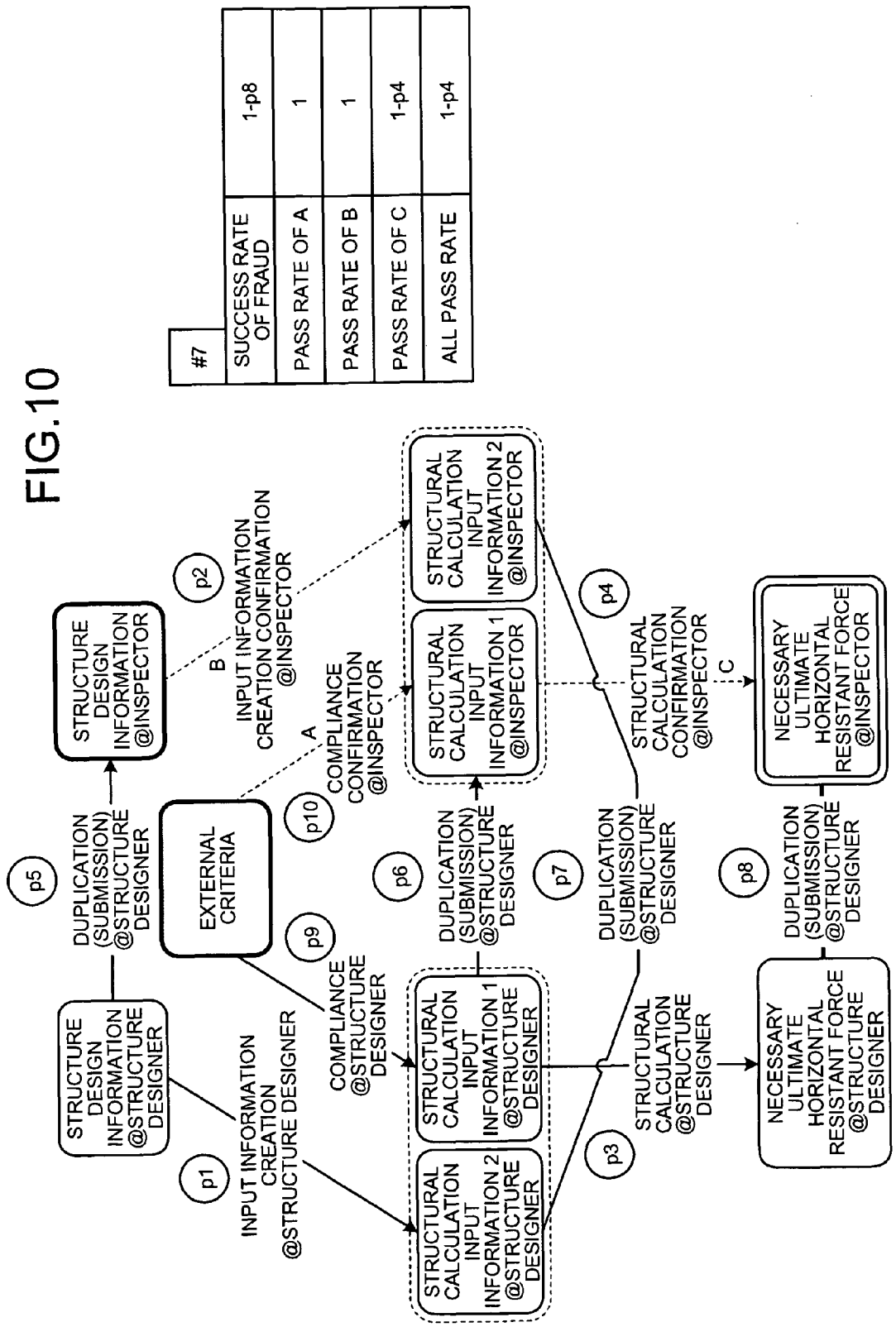

FIG.11

| FRAUD PATTERN | FRAUD | SUCCESS RATE (B) OF FRAUD PATTERN | ALL PASS RATE (T) | FRAUD DETECTION RATE (D) |
|---|---|---|---|---|
| #1 | SUCCESS | 1-p5 | 1-p2 | p5+(1-p5)p2 |
| #2 | SUCCESS | 1-p1 | 1-p2 | p1+(1-p1)p2 |
| #3 | SUCCESS | 1-p9 | 1-p10 | p9+(1-p9)p10 |
| #4 | FAILURE | 1-p6 | (1-p10)(1-p4) | p6+(1-p6){1-(1-p10)(1-p4)} |
| #5 | FAILURE | 1-p7 | (1-p2)(1-p4) | p7+(1-p7){1-(1-p2)(1-p4)} |
| #6 | SUCCESS | 1-p3 | 1-p4 | p3+(1-p3)p4 |
| #7 | SUCCESS | 1-p8 | 1-p4 | p8+(1-p8)p4 |

FIG.12

| FRAUD PATTERN | FRAUD | ALL PASS RATE (T) [p10=1] | ALL PASS RATE (T) [p4=1] | FRAUD DETECTION RATE (D) [p1, p3, p5, p9=0, p10=1] |
|---|---|---|---|---|
| #1 | SUCCESS | 1-p2 | 0 | p2 |
| #2 | SUCCESS | 1-p2 | 1-p2 | p2 |
| #3 | SUCCESS | 0 | 1-p10 | 1 |
| #4 | FAILURE | 0 | 0 | 1 |
| #5 | FAILURE | (1-p2)(1-p4) | 0 | p7+(1-p7){1-(1-p2)(1-p4)} |
| #6 | SUCCESS | 1-p4 | 0 | p4 |
| #7 | SUCCESS | 1-p4 | 0 | p8+(1-p8)p4 |

FIG.16

|  | node₁ | node₂ | ... | nodeᵢ | ... | nodeⱼ | ... | nodeₙ |
|---|---|---|---|---|---|---|---|---|
| node₁ | | | | | | | | |
| node₂ | | | | | | | | |
| ... | | | | | | | | |
| nodeᵢ | | | | NODE INFOR- MATION | | ACTION INFOR- MATION | | |
| ... | | | | | | | | |
| nodeⱼ | | | | | | | | |
| ... | | | | | | | | |
| nodeₙ | | | | | | | | |

COMPUTER PROGRAM PRODUCT, METHOD, AND APPARATUS FOR CALCULATING RELIABILITY OF AN APPLICATION PROCEDURE FOR FRAUD USING AN ESTIMATED PROBABILITY OF DETECTION OF FRAUD

BACKGROUND OF THE INVENTION

1. Field of the Invention

The present invention relates to a reliability evaluation program, a reliability evaluation method, and a reliability evaluation apparatus for evaluating reliability of an application procedure, and, more particularly to a reliability evaluation program, a reliability evaluation method, and a reliability evaluation apparatus for quantitatively evaluating an application procedure in terms of reliability, thereby supporting a design or improve operation for securing the reliability of the application procedure.

2. Description of the Related Art

Generally, in an application procedure that requires a high reliability, processes are performed with confirming that contents of an application form are correct, based on the application form or a certificate. In such an application procedure, the certificate has great significance to confirm facts. Recently, to enhance the reliability of the certificate, an advanced anti-counterfeit technology such as electric signature described in Japanese Patent No. 3588042 has been applied to the certificate.

However, even when the advanced anti-counterfeit technology is applied to the certificate, it is difficult to ensure reliability of the application procedure when the application procedure has many processes and is complicated. The complicated application procedure is likely to show vulnerability to frauds such as "spoofing" (pretending to be somebody else) during the processes, and operation errors are easily to happen.

To enhance the reliability of the application procedure, a technique of quantitatively evaluating the reliability of the application procedure to support finding of problems or devising an improvement plan is effective. However, although a technique of analyzing the processes in terms of efficiency or reduction of costs is typically known, there is no technique of analyzing the processes in terms of reliability.

SUMMARY

It is an object of the present invention to at least partially solve the problems in the conventional technology.

According to an aspect of the present invention, a computer program product has a computer readable medium including programmed instructions for evaluating reliability of an application procedure. The instructions, when executed by a computer, cause a computer to perform reading information as to whether an action of fact confirmation performed between nodes that are objects relating to fact confirmation in the application procedure is an action of operating information or an action of confirming information, from a storage unit; and when the information indicates that a fraud is committed in the action of operating information, calculating the reliability of the application procedure based on a probability of detection of a fraud in an action of confirming information performed in a node connected to the action of operating information.

According to another aspect of the present invention, a method for evaluating reliability of an application procedure, includes reading information as to whether an action of fact confirmation performed between nodes that are objects relating to fact confirmation in the application procedure is an action of operating information or an action of confirming information, from a storage unit; and when the information indicates that a fraud is committed in the action of operating information, calculating the reliability of the application procedure based on a probability of detection of a fraud in an action of confirming information performed in a node connected to the action of operating information.

According to still another aspect of the present invention, an apparatus for evaluating reliability of an application procedure, includes a reading unit that reads information as to whether an action of fact confirmation performed between nodes that are objects relating to fact confirmation in the application procedure is an action of operating information or an action of confirming information, from a storage unit; and a reliability calculating unit that, when the information indicates that a fraud is committed in the action of operating information, calculates the reliability of the application procedure based on a probability of detection of a fraud in an action of confirming information performed in a node connected to the action of operating information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4 to 10 are action diagrams of an example of a fraud pattern;

FIG. 11 depicts index values of reliability of fraud patterns;

FIG. 12 depicts estimates of the index values of reliability of the fraud patterns;

FIG. 16 is a schematic diagram of information stored in an action-diagram storage unit;

DETAILED DESCRIPTION OF THE PREFERRED EMBODIMENTS

Exemplary embodiments of a reliability evaluation program, a reliability evaluation method, and a reliability evaluation apparatus according to the present invention will be explained in detail below with reference to the accompanying drawings.

An outline of a reliability evaluation method according to a first embodiment of the present invention is explained first, as an example of an application procedure for building construction authorization. In the building construction authorization application procedure, an application form indicating that a structure of a designed building has sufficient strength and the like is submitted to obtain construction authorization for the building.

Figure 1:
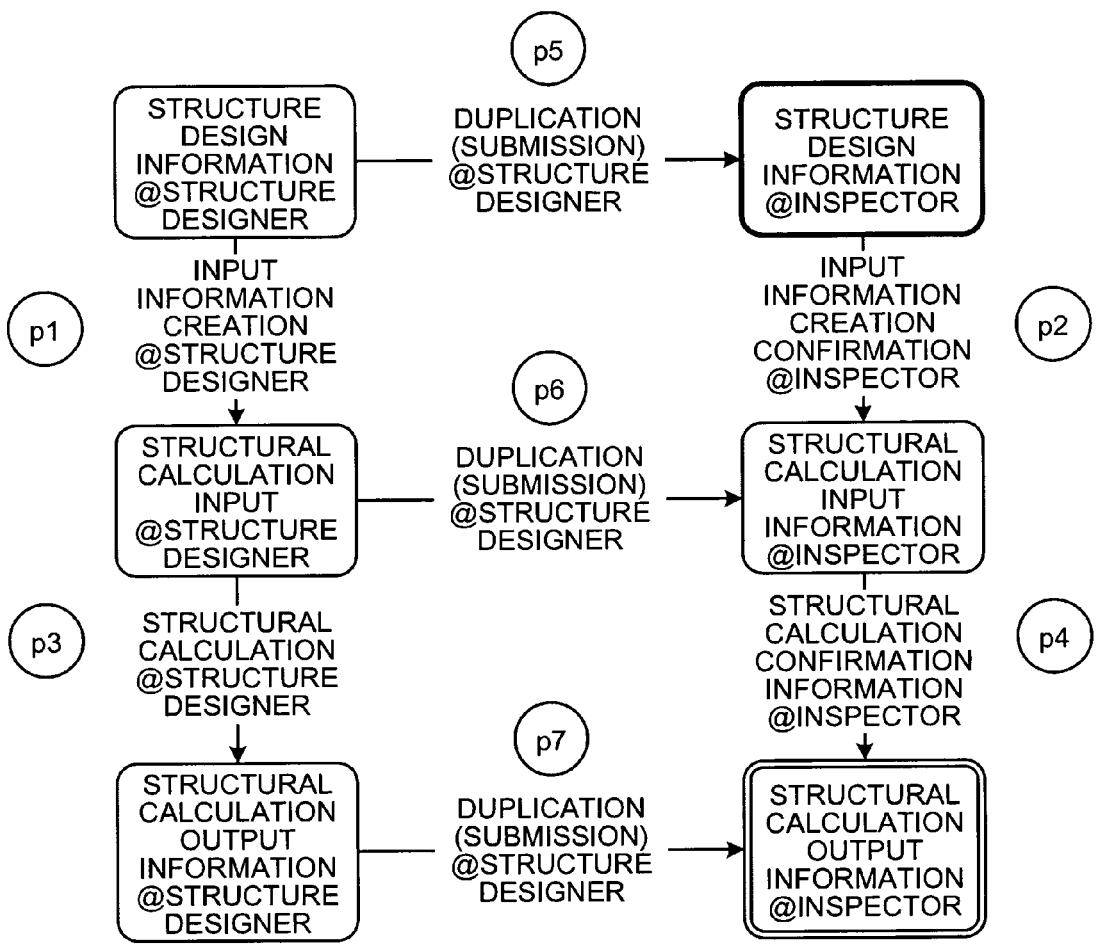
FIG. 1 is an example of an action diagram of a modeled application procedure for building construction authorization.

FIG. 1 is an example of an action diagram of a modeled application procedure for building construction authorization. As shown in FIG. 1, the action diagram includes rectangular shapes corresponding to objects, which are connected by lines corresponding to actions.

An object represents a document or the like, used to confirm facts at steps of the procedure. In the reliability evaluation method according to the first embodiment, the same document or the like used in different processes is handled as different objects.

In the present specification, to distinguish objects in different processes, an object is represented in the following manner: <Object name>@<Owner of an object in the corresponding process>. For example, "structure design information@structure designer" and "structure design information@inspector" that are physically the same are handled as different objects in the reliability evaluation method according to the first embodiment.

An action represents a process and the like, performed associated with the object. The action has directionality depending on a direction of transmission or conversion of information. Arrows in the action diagram show the directionalities. In the present specification, an action is represented in the following manner: <Action name>@<Actor of an action>.

The application procedure for building construction authorization shown in FIG. 1 is explained. The application procedure for building construction authorization shown in FIG. 1 includes objects of "structure design information@structure designer", "structural calculation input information@structure designer", "structural calculation output information@structure designer", "structure design information@inspector", "structural calculation input information@inspector", and "structural calculation output information@inspector".

The "structure design information structure designer" is information created by a structure design of a building by a structure designer, which turns into "structural calculation input information@structure designer" due to an action of "input information creation@structure designer". The "input information creation@structure designer" is an action of creating input information for performing structural calculation of the building based on the "structure design information@structure designer". The "structural calculation input information@structure designer" is created by this action.

The "structural calculation input information@structure designer" turns into "structural calculation output information@structure designer" due to an action of "structural calculation@structure designer". The "structural calculation@structure designer" is an action of performing the structural calculation of the building based on the "structural calculation input information@structure designer". The "structural calculation output information@structure designer" is created by this action.

The "structure design information@structure designer", the "structural calculation input information@structure designer", and the "structural calculation output information@structure designer" turn into "structure design information@inspector", "structural calculation input information@inspector", and "structural calculation output information@inspector", respectively, due to an action of "duplication (submission)@structure designer".

The "duplication (submission)@structure designer" is an action of duplicating an object and submitting a duplicated object to a destination. The "structure design information@inspector", the "structural calculation input information@inspector", and the "structural calculation output information@inspector" are inspected by the inspector. In this example, because details of the objects before and after the application are the same, each of the "duplication (submission)@structure designer" is a bidirectional action.

The "structure design information@inspector" is inspected by being compared with the "structural calculation input information@inspector" by an action of "input information creation confirmation@inspector". The "structural calculation input information@inspector" is inspected by being compared with the "structural calculation output information@inspector" by an action of "structural calculation confirmation@inspector". The "input information creation confirmation@inspector" and the "structural calculation confirmation@inspector" are actions of trying to create the information or perform the structural calculation using part or all of the information to be inspected, to confirm the objects to be inspected.

In the action diagram shown in FIG. 1, probabilities $p_1$ to $p_7$ are set for the actions, respectively. The probabilities $p_1$ to $p_7$ are ones with which the corresponding actions are correctly performed.

The actions of the application procedures are divided into actions of performing an operation (transmission or conversion) of information and actions of confirming information. Actors of the former actions can be both an applicant and a respondent (a person to whom an application is submitted), while actors who take the latter actions in the procedure are only the respondent. In other words, a fraud committed in the application procedure can be said as follows: An applicant intervenes in an action of information operation to bring a result that is not expected in system designing, to mislead an action of information confirmation by the respondent.

Whether an information confirming action is correctly made depends on whether any fraud is committed in a relevant information operating action. Therefore, this is reflected on probability calculation. A normal probability is defined as follows.

A normal probability $p_e$ of the information confirming action is defined as a probability with which the respondent detects that nodes to be confirmed on both ends of the action are inconsistent due to a fraud of the applicant (probability of not making a so-called "type II error"). A normal probability of the information operating action is defined as a probability of succeeding to defend against a fraud that is challenged by the applicant in the operation (i.e., the fraud is unsuccessful).

Estimation of the normal probability by a statistical research or the like is considered. Actual frauds are detected directly at the information operating action, or detected at the information confirmation ex-post facto. Naturally, not all frauds are detected, and information about the number of overlooked frauds and the like cannot be obtained. Accordingly, estimation of the probability is difficult. In such cases, assuming that the number of the actual frauds is a constant multiple of the number of detected frauds, "(constant×number of detected frauds)/total number of applications" can be obtained as an estimate value of the probability.

According to a method of experimentally obtaining the probability, a decoy experiment is performed by trying ways of frauds that have been actually committed to authorities concerned, and "the number of detected frauds/the number of trials" can be obtained as an estimate value of the probability based on a result as to whether the authorities can detect the frauds. According to the first embodiment, however, determination of the probability in a numerical value is not essential. An approximation of the estimated probability can be input, or the probability can be handled as a variable. A result obtained by changing the variable between 0 (zero) and 1 can be visualized to observe behavior of the reliability, thereby evaluating the reliability of the procedure.

Under the above definition, a probability (pass rate) t of passing of an application procedure through a gate of an information confirming action is "1" as shown by the following equation (1), when no fraud is committed to nodes on both ends of the corresponding edge.

$$t_a = 1 \quad (1)$$

Figures 2A, 2B:
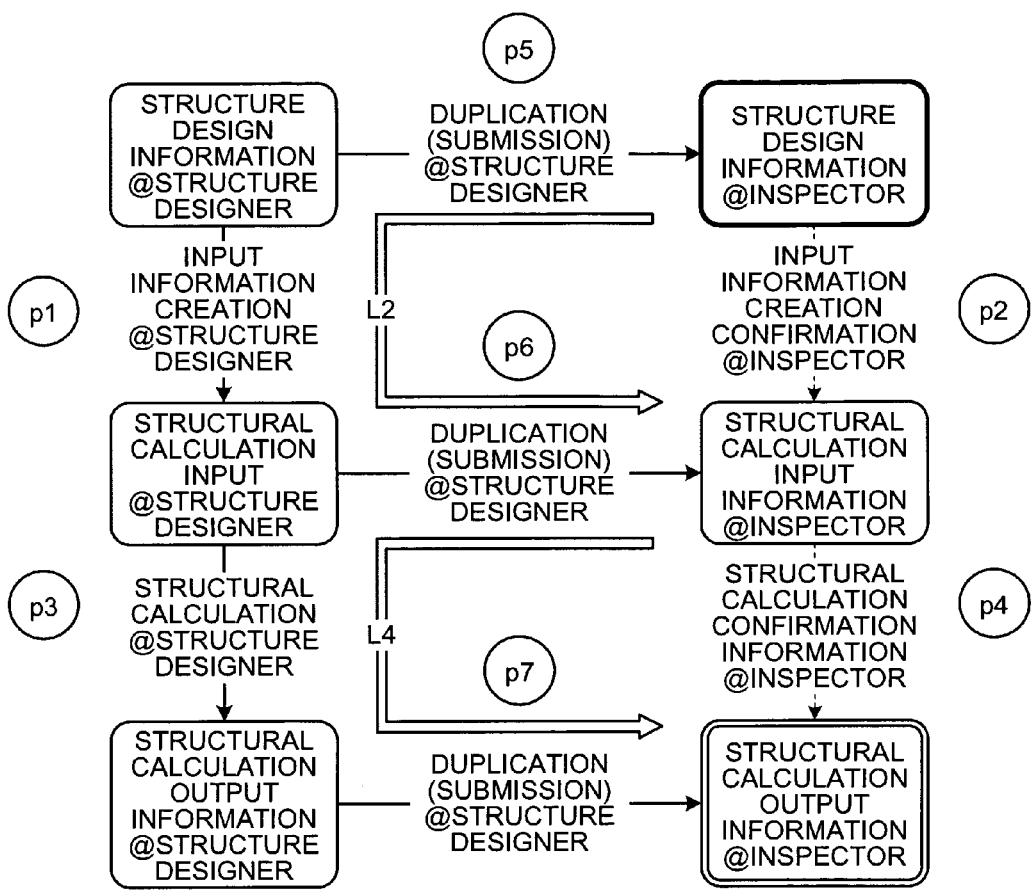
FIG. 2A is a schematic diagram for explaining edges in the action diagram.
FIG. 2B is a schematic diagram for explaining calculated examples of reliability indexes.

Meanwhile, when some fraud is committed to the nodes on both ends of the edge, the pass rate t is obtained by the following equation (2). Whether any fraud is committed to the nodes on the both ends is determined depending on whether a fraud is committed on at least one edge anywhere on a path L (including only information operating actions) connecting objects on both ends of the information confirming action, in the graph of the action diagram. Accordingly, as shown in FIG. 2A, a collection of edges of the action diagram is divided into two, i.e., a collection of edges of information operation and a collection of edges of information confirmation. A pass rate $t_a$ of an edge of information confirmation (a∈A) with respect to a fraud pattern F (collection of edges to which a fraud is challenged by the applicant) is obtained by the following equation (2).

$$t_a = 1 - p_a \quad (2)$$

The pass rates $t_a$ of all the information confirming actions in the application procedure are obtained. Assuming that these pass rates are all independent of each other, the product of the pass rates is obtained as an all pass rate T(F) by the following equation (3).

$$T(F) = \prod_{a \in A} t_a \quad (3)$$

There are two types of detection of frauds, i.e., a case in which a fraud is detected at the information operating action, and a case in which a fraud is not detected at that action but detected in an information confirming action relating to the operation. To prevent these frauds from being detected as a whole, the frauds at all possibly plural information operating actions must be successful, and all gates of the information confirming actions must be passed. When viewed as a graph, one fraud pattern corresponds to a state in which several edges of the information operating action are cut off.

Assuming that a collection of edges that are cut off is F, a fraud detection rate D(F) with respect to the collection F in the entire application is obtained by the following equation (4). In equation (4), B(F) denotes a probability with which all frauds at the information operating actions are not detected before the corresponding information confirming action.

$$D(F) = 1 - B(F) \times T(F) \quad (4)$$

$$B(F) = \prod_{e \in F} (1 - p_e)$$

In the equation of B(F), the product of fraud success rates on the edges in the collection F is simply calculated. Whether the fraud is detected on each edge of the information operating action greatly depends on various situations of the respective operations, and thus is assumed to be independent of each other.

A specific calculation example of indexes is shown in FIG. 2B, for cases in which a fraud is challenged only in one of five information operating actions shown in FIG. 2A. That is, FIG. 2B shows fraud patterns #1 to #5. FIG. 2B shows calculation examples of whether an object has been achieved, a success rate (B) of the fraud pattern, the all pass rate (T), and the fraud detection rate (D) in cases in which frauds are committed in information operating actions of duplication (submission) @structure designer, input information creation@structure designer, duplication (submission)@structure designer, structural calculation@structure designer, and duplication (submission)@structure designer, respectively.

Whether original fraudulent objects are achieved when the fraud patterns are succeeded is determined whether a path including information operating actions from a node of the structure design information@inspector to a node of the structural calculation output@inspector is cut off by the frauds.

A specific example of application of the present invention to calculation of a necessary ultimate horizontal resistant force, which is one of structural calculations performed in the building construction authorization application is explained.

Figure 3:
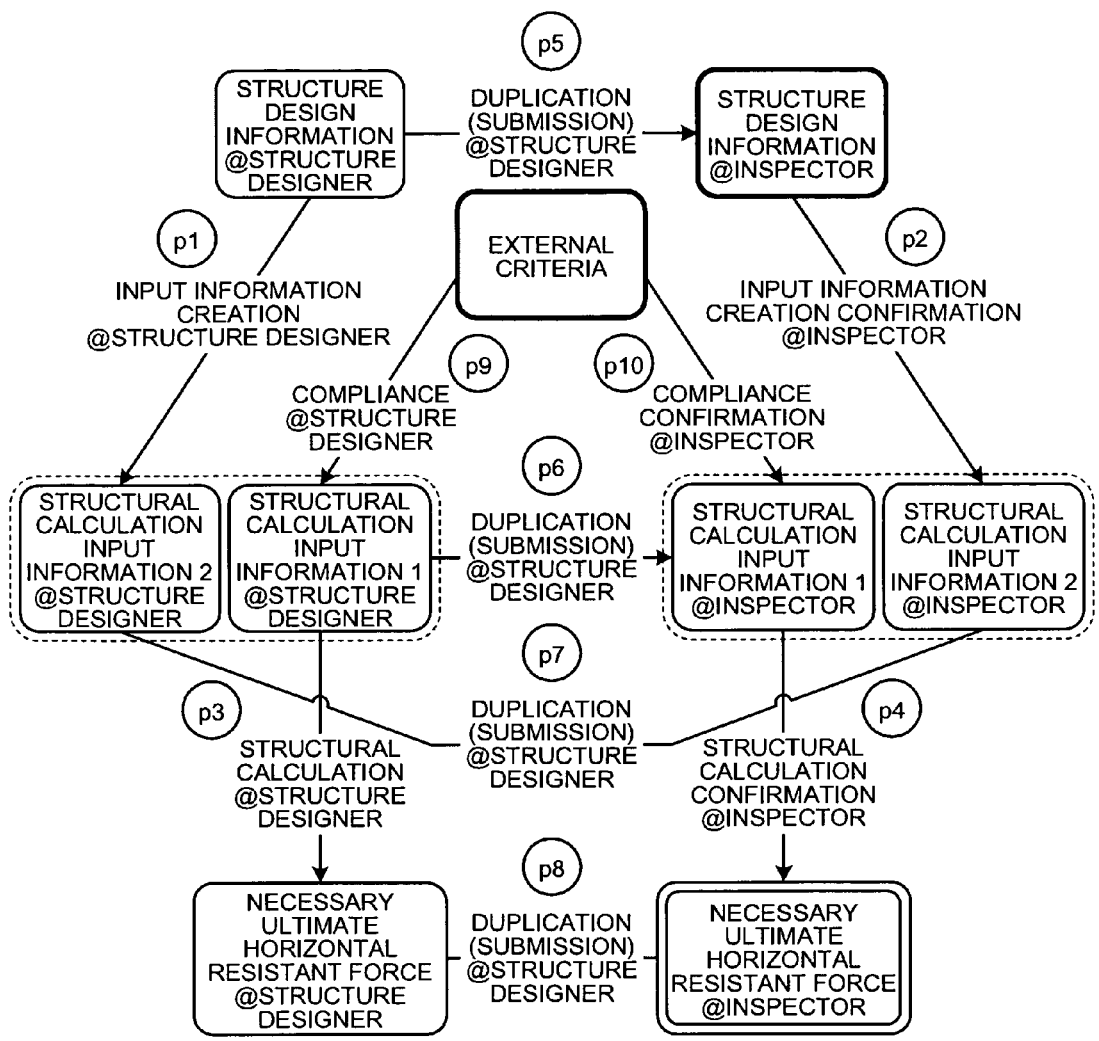
FIG. 3 is a schematic diagram for explaining an action diagram relating to necessary ultimate horizontal resistant force.

With respect to an action diagram of calculation of a necessary ultimate horizontal resistant force shown in FIG. 3, a process of calculating indexes of reliability is explained. As shown in FIG. 3, there are seven edges ($p_5$, $p_1$, $p_9$, $p_6$, $p_7$, $p_3$, and $p_8$) of information operating actions in total. Therefore, when all fraud patterns are considered, 128 patterns are to be examined. In this example, however, the examination is performed assuming that seven patterns of frauds are committed to any one of the edges. In an actual fraudulent case, it is unlikely that frauds are committed in several actions because the risk of detection is increased. Therefore, it is considered that evaluation of only this simple case counts for a great deal. In the diagram shown in FIG. 3, when one of the edges is properly selected, information to be confirmed can be arbitrary affected.

FIGS. 4 to 10 depict results of calculation of the success rates of the fraud patterns, the pass rates of the information confirming actions, and the all pass rates, with respect to the seven fraud patterns, respectively. The edges in heavy lines in FIGS. 4 to 10 represent parts in which frauds are committed.

Figure 4:
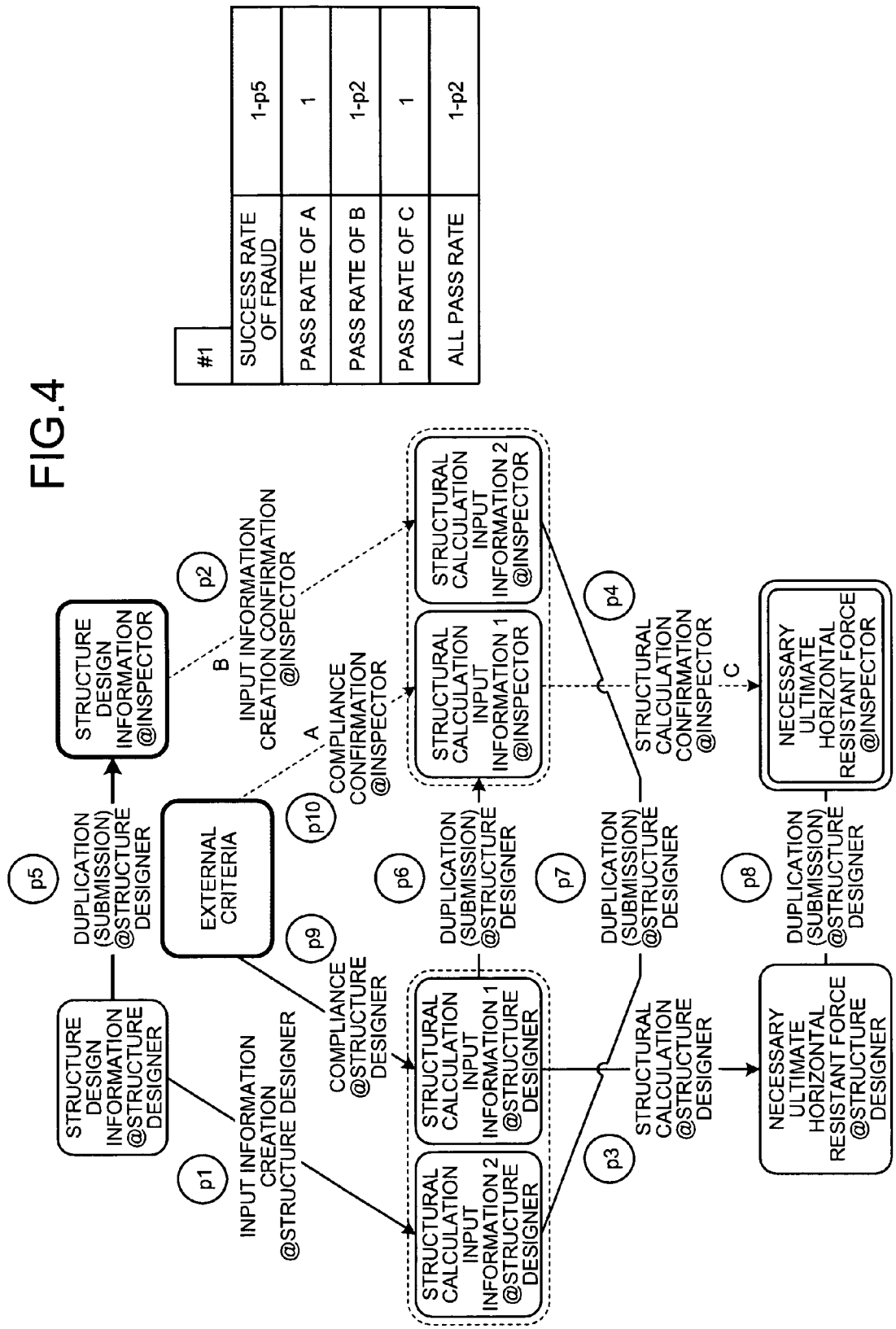
Figure 5:
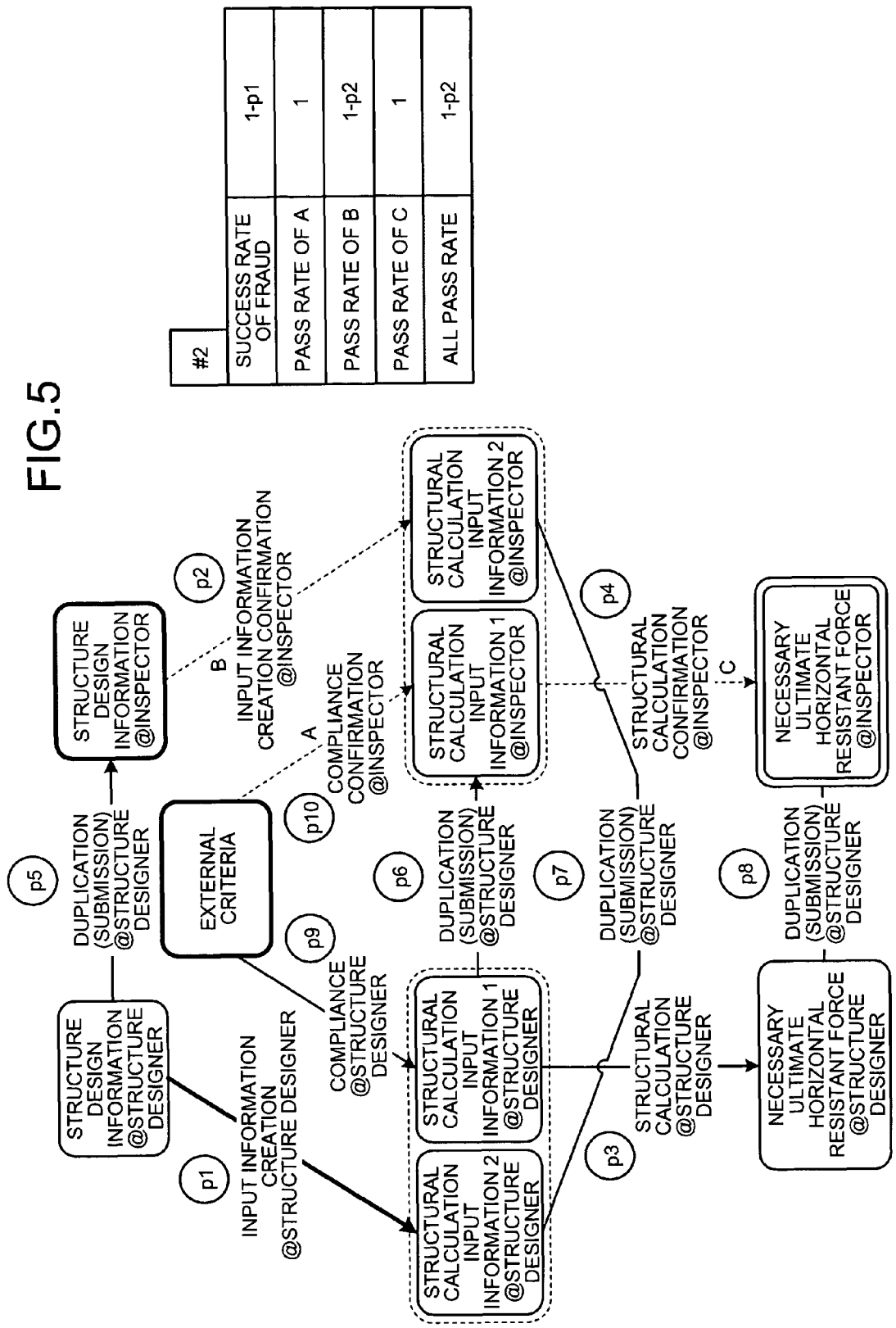
Figure 6:
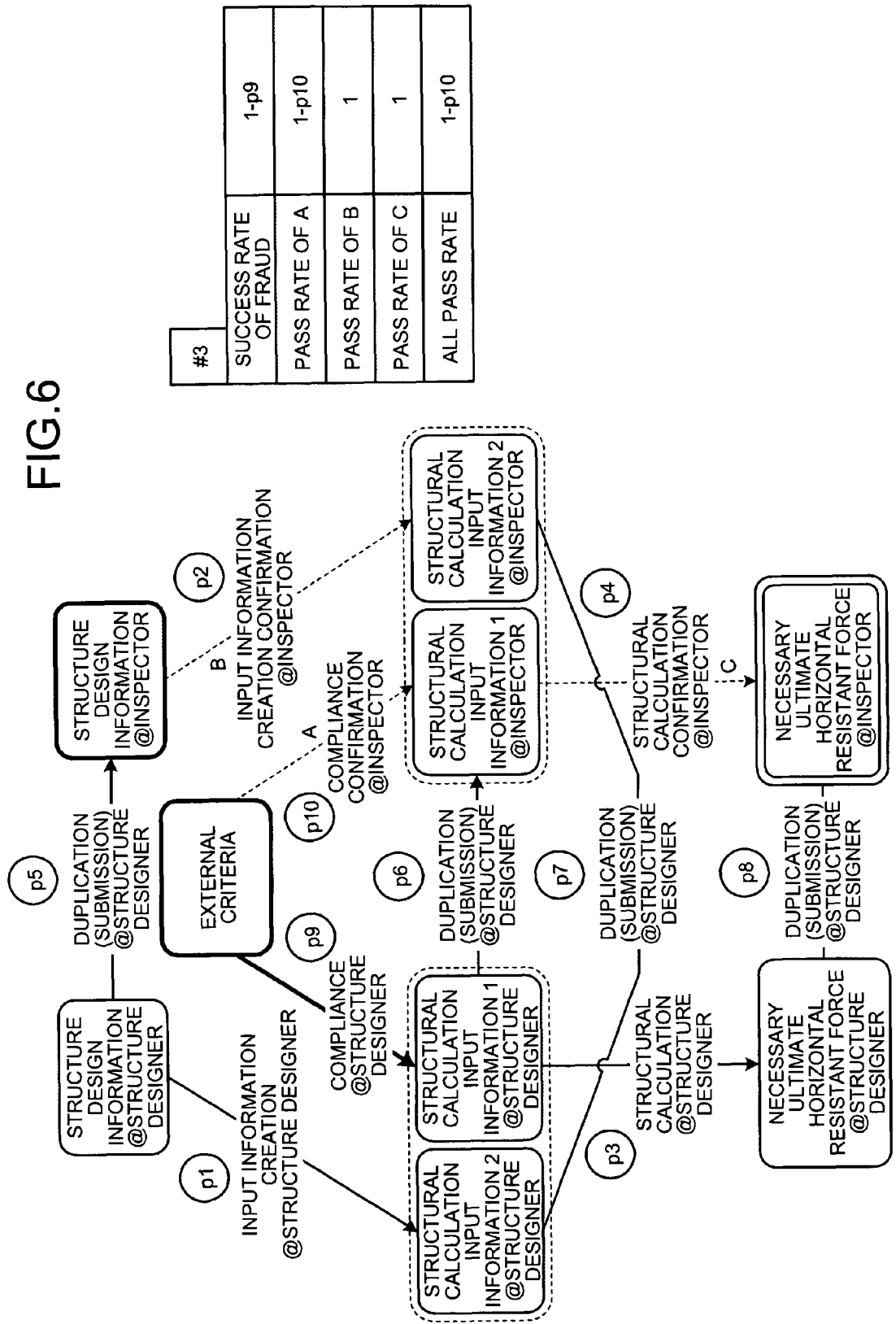
Figure 7:
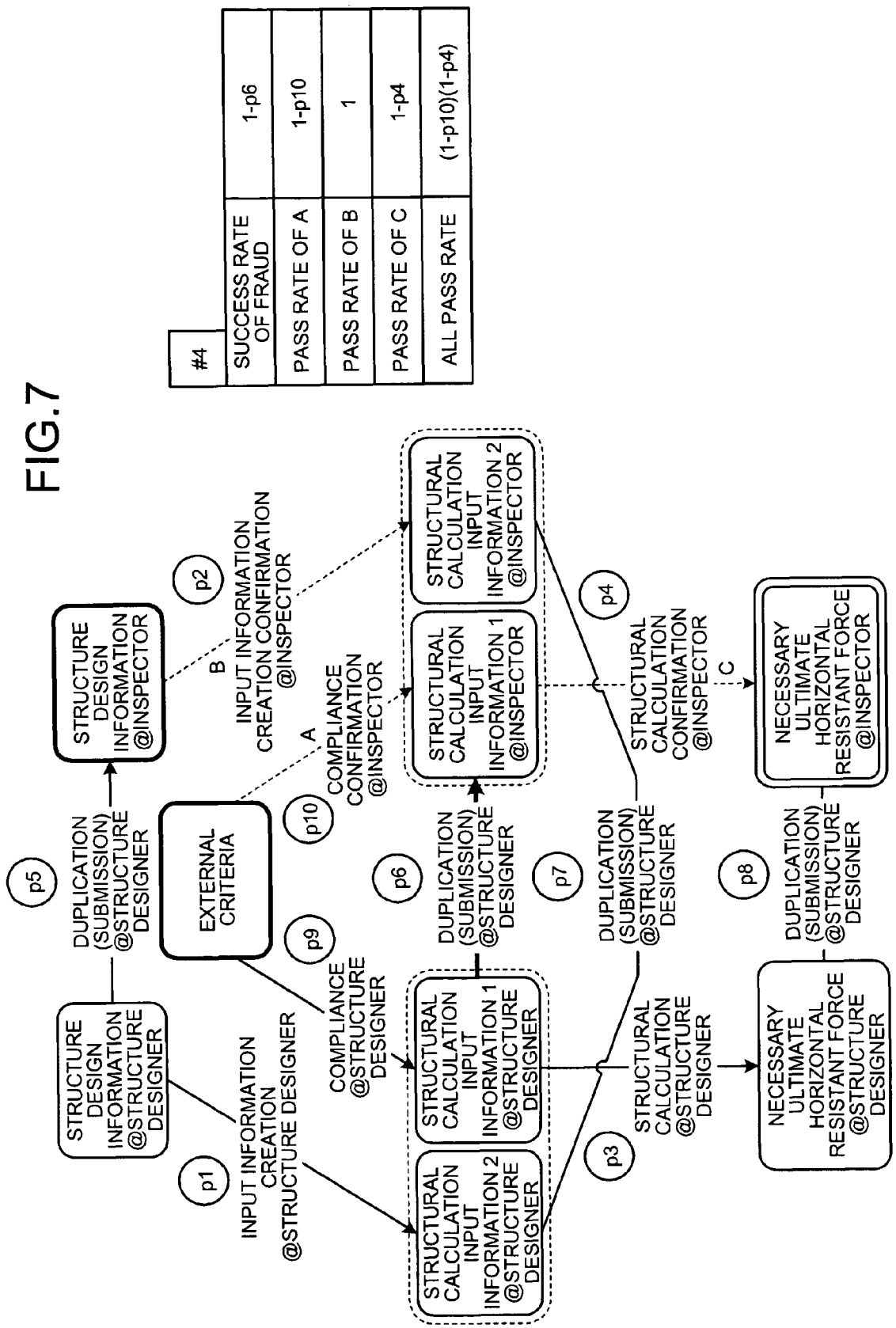

For example in FIG. 4, assuming that a fraud is committed in an action ($p_5$) of duplication (submission)@structure designer, the success rate of the fraud is "1−$p_5$". The pass rates of A, B, and C are "1", "1−$p_2$", and "1", respectively. Specifically, the pass rate of B is "1−$p_2$" because the fraud in the action ($p_5$) of the duplication (submission)@structure designer can be detected by an action of input information creation@inspector. The all pass rate, which is the product of the pass rates of A, B, and C, is "1−$p_2$".

FIG. 11 depicts index values and fraud detection rates that are calculated with respect to the seven fraud patterns as shown in FIGS. 4 to 10, respectively. In FIG. 11, the index values and the fraud detection rates are obtained by the equations 1 to 4 as mentioned above. It is determined whether the fraud is determined, with setting the object of a fraud committed here as "fudging a necessary ultimate horizontal resistant force of a building (to a lower value)".

The all pass rate represents a probability with which an applicant commits a fraud pattern successively, and the fraud is overlooked by the respondent in all of information confirming actions performed. Therefore, comparison of the all pass rates among the fraud patterns is useful in determining easiness of success of the fraud pattern (or likelihood of being targeted). The comparison is difficult in the form of usual multivariable, and thus a reasonable assumption is made for individual application procedures to make the comparison by using visualizing means such as a graph. Even when conclusive values of the indexes cannot be determined, variables that remain in the equations simplified by assignment or a relation between the variables can provide certain levels of analysis results.

FIG. 12 depicts an estimated example based on the facts as mentioned above that confirmation of compliance with external criteria is easy ($p_{10}=1$), that recalculation of the necessary ultimate horizontal resistant force is easy ($p_4=1$), that a fraud in an action that is remotely performed by the structure designer cannot be directly detected ($p_1, p_3, p_9=0$), and that a fraud in arbitrary information such as structure design information itself cannot be detected ($p_5=0$), and combinations thereof.

Figure 13:
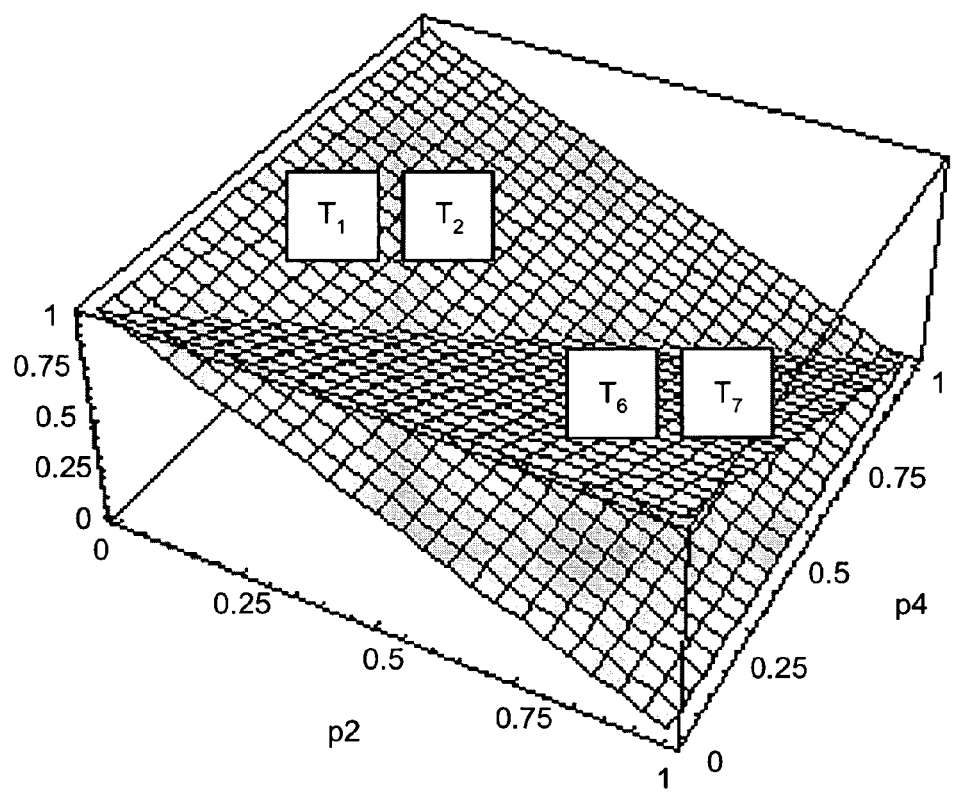
FIG. 13 is a schematic diagram for explaining an example of a graph of all-pass rates.

FIG. 13 is a graph of Ti [$p_{10}=1$] ("i" denotes a fraud pattern number) of the respective fraud patterns, which is obtained with $p_2$ and $p_4$ on axes (it is assumed that T3 and T4=0, and objects of the frauds #4 and #5 cannot be achieved). When seeing a graph considering that confirmation of creation of input information (estimation) is much more difficult than recalculation of a definition inequality ($p_2 \ll p_4$) in the actual examination process, the fraud patterns #1 and #2 have higher all pass rates, and are determined to be particularly alarming.

Figure 14:
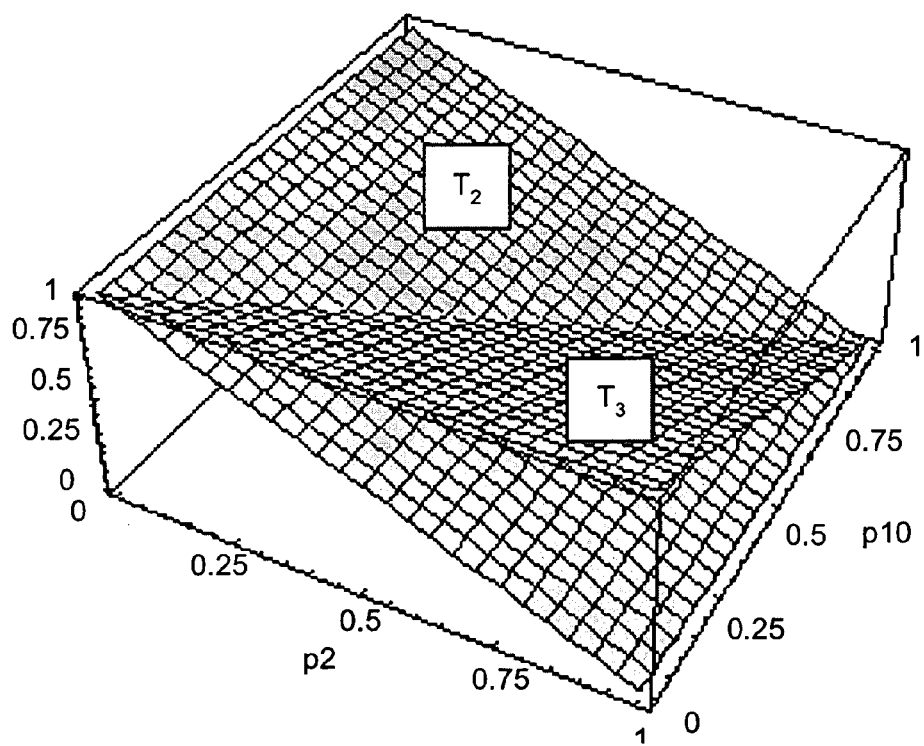
FIG. 14 is a schematic diagram for explaining another example of a graph of all-pass rates.

FIG. 14 is a graph of Ti [$p_4=1$] similarly obtained. Considering that the confirmation of compliance with the external criteria is more difficult than confirmation of creation of input information ($p_2 \gg p_{10}$), the fraud pattern #2 remains. Eventually, it is considered that the fraud pattern #2 should be most watched at the examination. When assuming that $p_{10}=1$ and $p_4=1$ as an extreme case, all $T_i$ become 0, except for T2=$1-p_2$. This means that secure compliance confirmation and recalculation prevents many of frauds relating to the calculation of the necessary ultimate horizontal resistant force.

Figure 15:
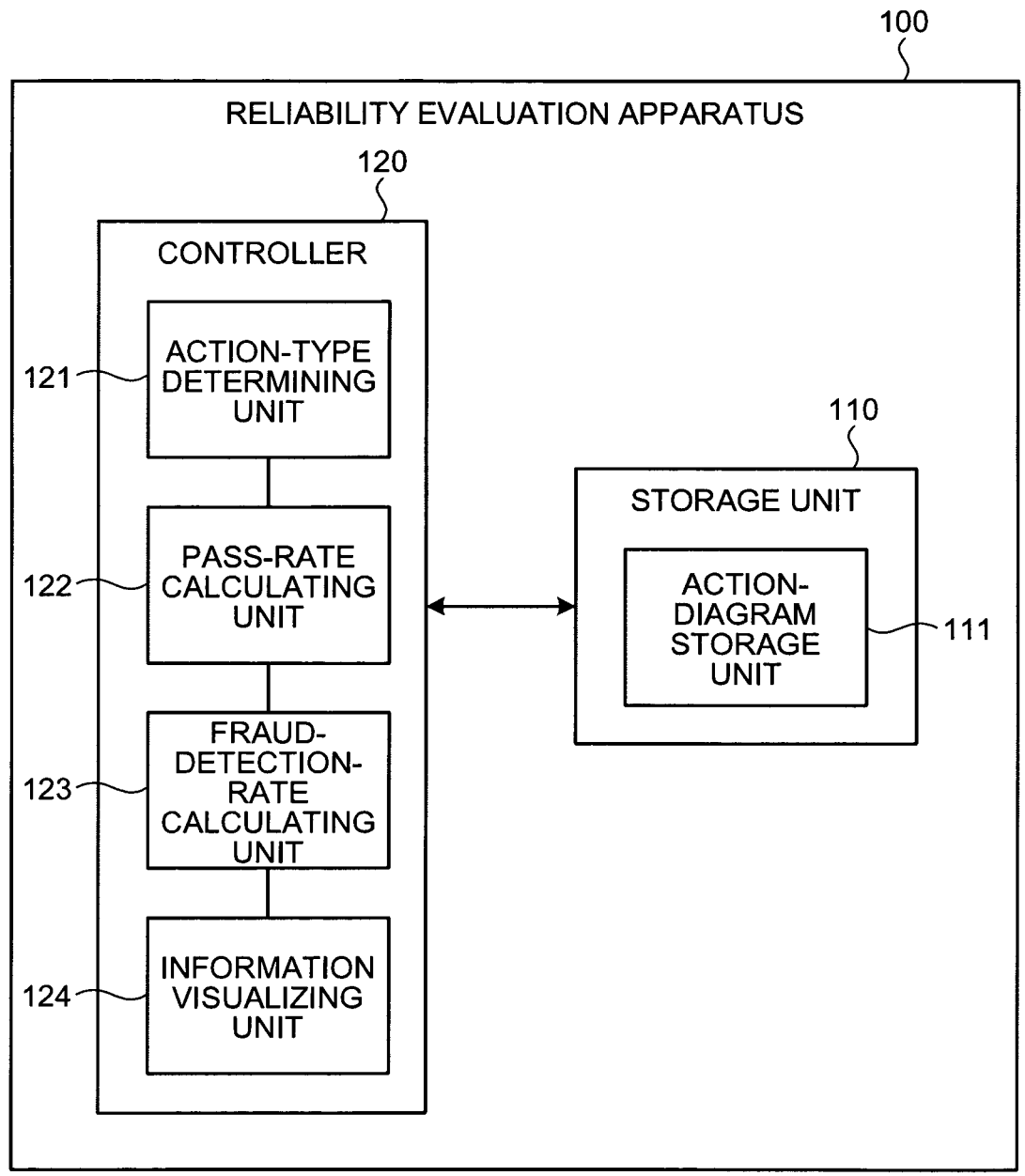
FIG. 15 is a block diagram of a configuration of a reliability evaluation apparatus according to a first embodiment of the present invention.

A configuration of a reliability evaluation apparatus 100 that evaluates reliability of an application procedure, using the reliability evaluation method according to the first embodiment is explained. FIG. 15 is a functional block diagram of a configuration of the reliability evaluation apparatus 100. As shown in FIG. 15, the reliability evaluation apparatus 100 includes a storage unit 110 and a controller 120.

The storage unit 110 stores various kinds of information, and has an action-diagram storage unit 111. The action-diagram storage unit 111 stores information relating to nodes (objects) included in an application procedure to be evaluated, and information relating to actions of fact confirmation performed between nodes. The action-diagram storage unit 111 also stores information indicating which node is a source or a verification point of the application procedure.

Specifically, the action-diagram storage unit 111 stores information of the nodes themselves and information of edges (actions) connecting different nodes, as shown in FIG. 16. The action-diagram storage unit 111 stores names and owners of the nodes as node information, and names, actors, types (information operation or information confirmation), and normal probabilities ($p_e$) of actions as action information.

The controller 120 controls the entire of the reliability evaluation apparatus 100, and includes an action-type determining unit 121, a pass-rate calculating unit 122, a fraud-detection-rate calculating unit 123, and an information visualizing unit 124.

The action-type determining unit 121 determines whether a fact confirming action performed between nodes that are objects relating to fact confirmation in the application procedure is an action of operating information or an action of confirming information.

The pass-rate calculating unit 122 calculates reliability of the application procedure when a fraud is committed in an information operating action, based on a probability of detection of a fraud in an information confirming action performed in a node connected to the information operating action.

The fraud-detection-rate calculating unit 123 calculates a sum of a probability of detection of a fraud in the information operating action and a probability of detection of a fraud in the information confirming action, as a fraud detection rate, to obtain reliability of the application procedure.

The information visualizing unit 124 displays a graph of Ti [$p_{10}=1$] ("i" denotes a fraud pattern number) of each fraud pattern (see FIGS. 13 and 14).

Figure 17:
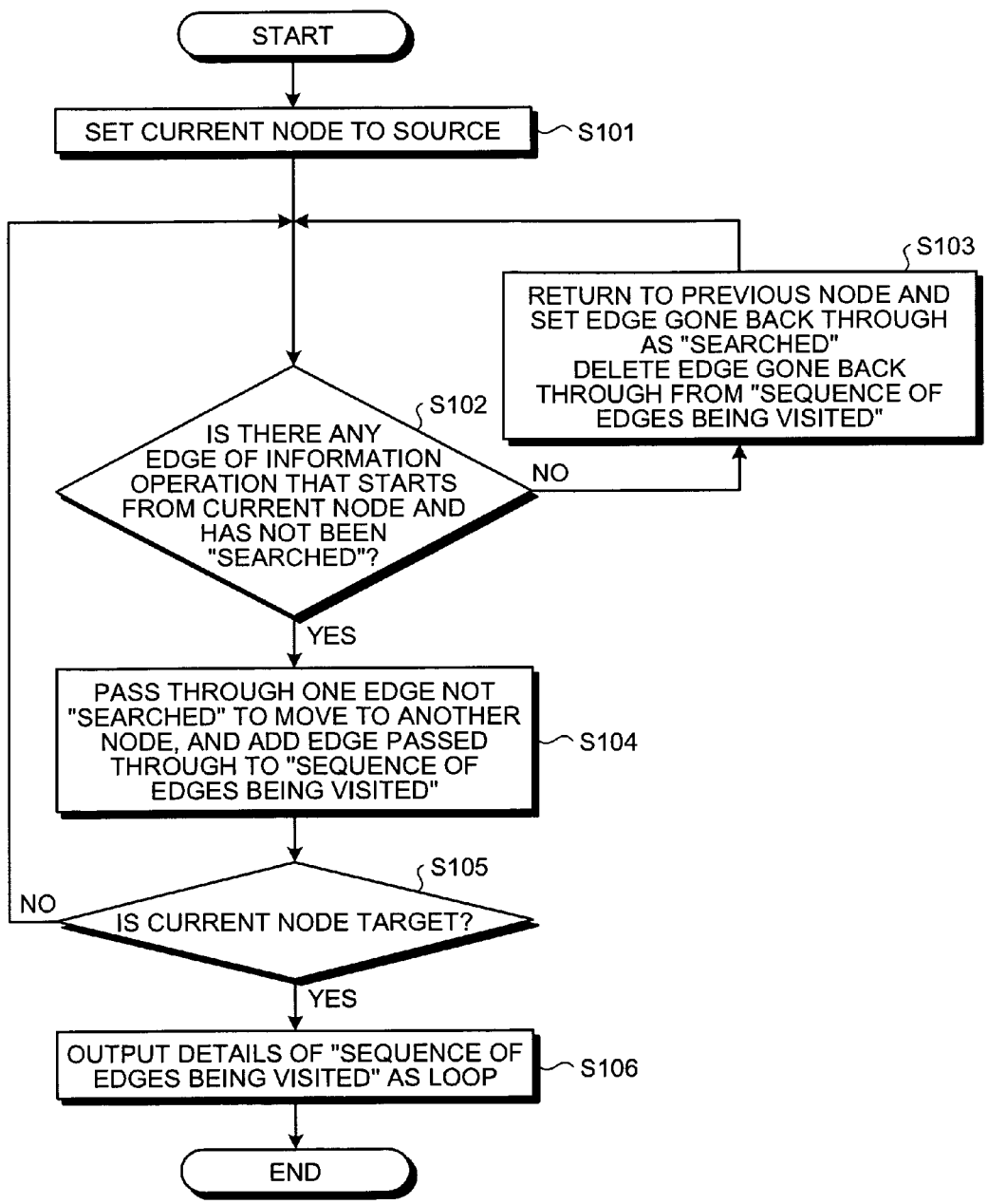
FIG. 17 is a flowchart of a path-searching process procedure.

A path searching process procedure performed by the reliability evaluation apparatus 100, as shown in FIG. 17 is explained next. FIG. 17 is a flowchart of the path searching process procedure.

As shown in FIG. 17, the reliability evaluation apparatus 100 sets a current node to a source (step S101), and determines whether there is any edge of information operation that starts from the current node and has not been searched yet (step S102). When no edge of information operation that starts from the current node and has not been searched yet is found (No at step S102), the reliability evaluation apparatus 100 returns to the previous node, sets the edge gone back through as a searched edge, and deletes the edge from a sequence of edges that are being visited (step S103).

When there are edges of information operation that start from the current node and has not been searched yet (YES at step S102), the reliability evaluation apparatus 100 passes through one of the edges that have not been searched yet to move to another node, and adds the edge passed through to the sequence of edges that are being visited (step S104). The reliability evaluation apparatus 100 determines whether the current node is a target (step S105). When the current node is not a target (NO at step S105), the reliability evaluation apparatus 100 returns to step S102. When the current node is a target (YES at step S105), the reliability evaluation apparatus 100 outputs details of the sequence of edges that are being visited as a path.

Figure 18:
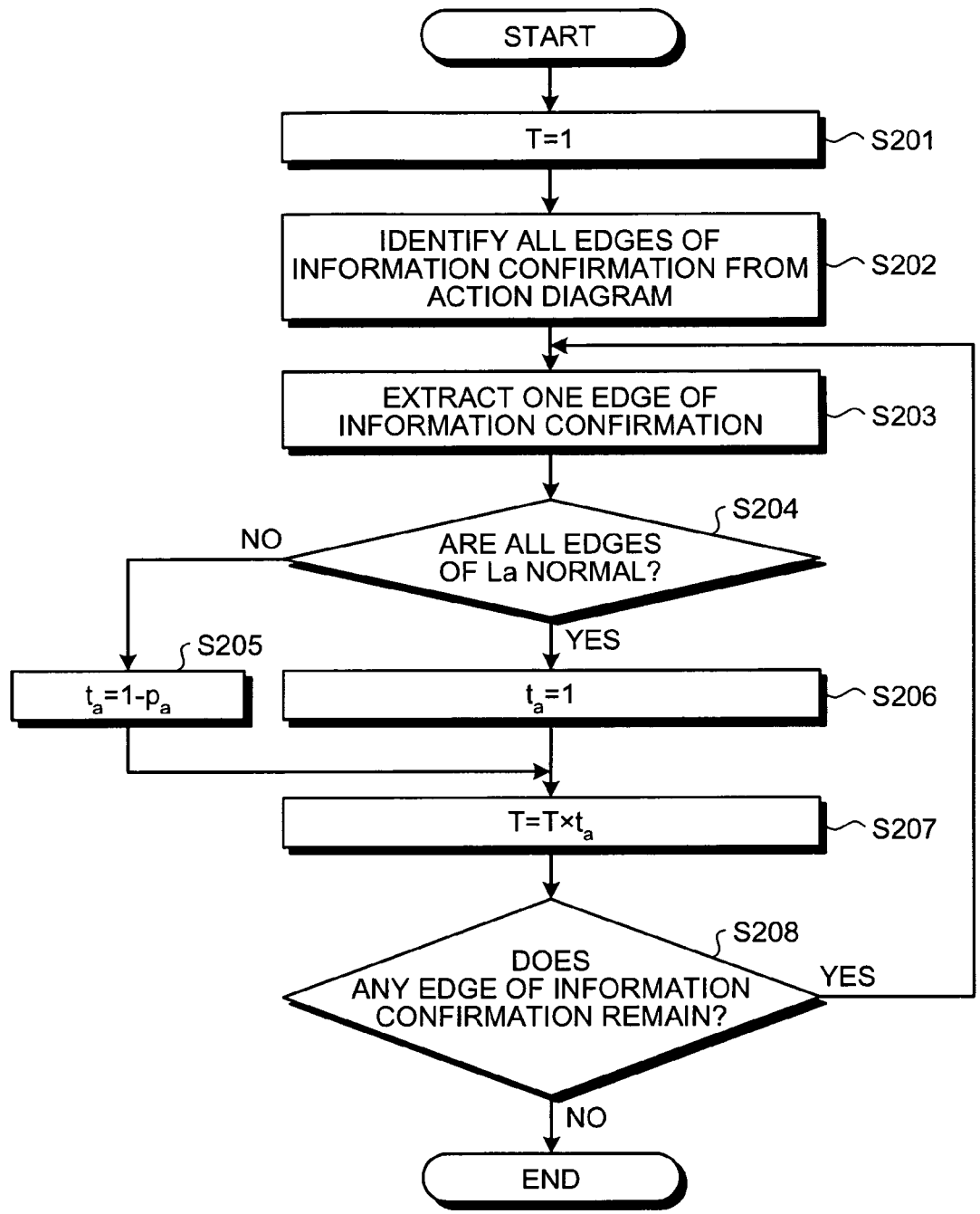
FIG. 18 is a flowchart of an all-pass-rate calculating process procedure.

A calculation process procedure for the all pass rate performed by the reliability evaluation apparatus 100 as shown in FIG. 18 is explained next. FIG. 18 is a flowchart of the calculation process procedure for the all pass rate.

As shown in FIG. 18, the reliability evaluation apparatus 100 sets T=1 as an initial value (step S201), and identifies all edges of information confirmation from the action diagram (step S202). The reliability evaluation apparatus 100 extracts one edge of information confirmation (step S203), to determine whether all edges of La are normal (step S204).

As a result, when not all edges of La are normal (NO at step S204), the reliability evaluation apparatus 100 calculates $t_a$ using the equation "$t_a=1-Pa$" (step S205). When all edges of La are normal (YES at step S204), the reliability evaluation apparatus 100 sets that $t_a=1$ (step S206), calculates T using a formula "$T=T \times t_a$" (step S207), and determines whether any edge of information confirmation remains (step S208).

Based on the above result, when the edge of information confirmation remains (YES at step S208), the reliability evaluation apparatus 100 returns to step S203. When no edge of information confirmation remains (NO at step S208), the reliability evaluation apparatus 100 terminates the process.

Figure 19:
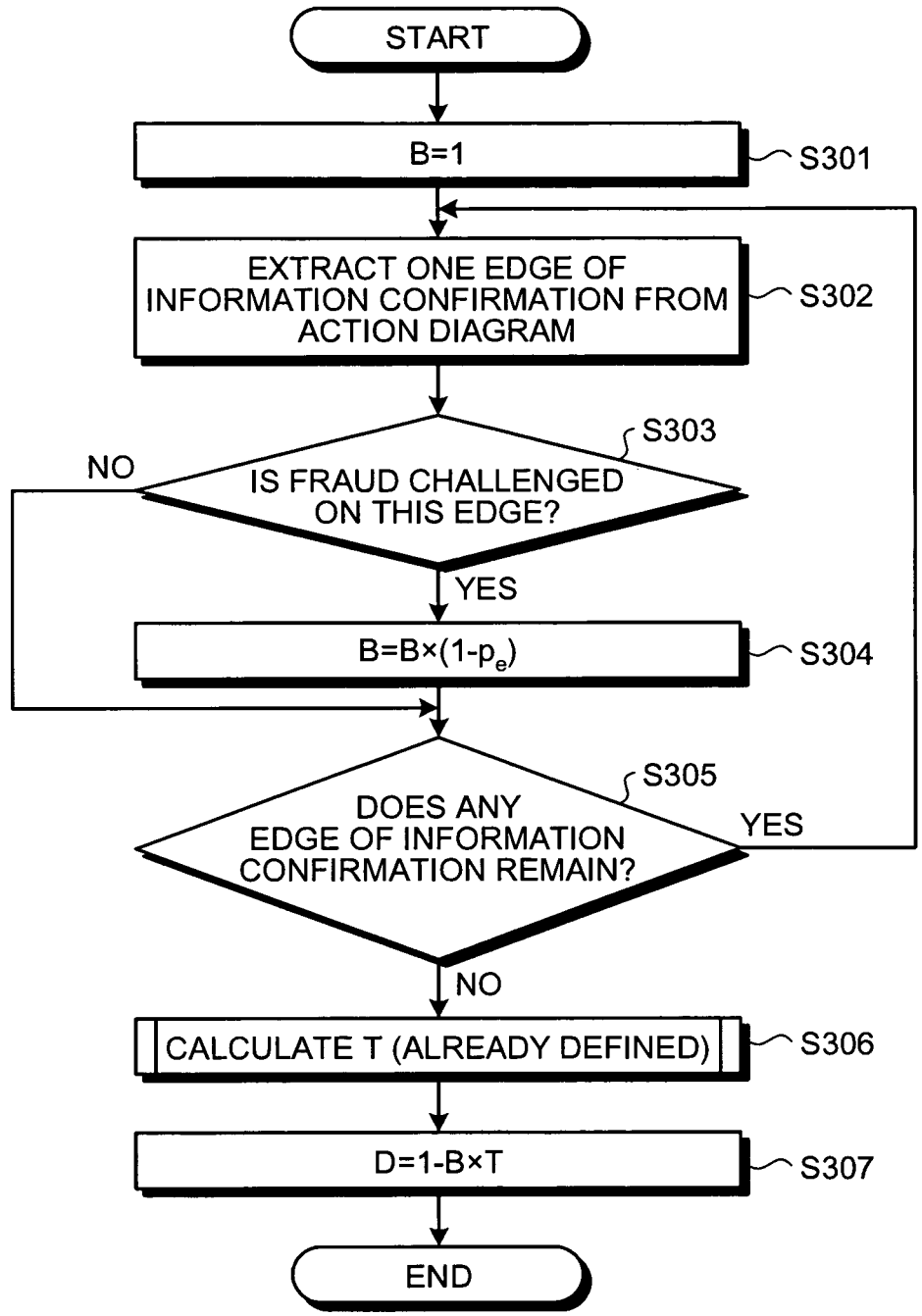
FIG. 19 is a flowchart of a fraud-detection-rate calculation process procedure.

A calculation process procedure for the fraud detection rate performed by the reliability evaluation apparatus 100 as shown in FIG. 19 is explained next. FIG. 19 is a flowchart of the calculation process procedure for the fraud detection rate.

As shown in FIG. 19, the reliability evaluation apparatus 100 sets B=1 as an initial value (step S301), and extracts one edge of information confirmation from the action diagram (step S302). The reliability evaluation apparatus 100 determines whether any fraud is challenged on the edge (step S303). When no fraud is challenged (NO at step S303), the reliability evaluation apparatus 100 proceeds to step S305.

Meanwhile, when some fraud is challenged on the edge (YES at step S303), the reliability evaluation apparatus 100 calculates B using a formula "$B=B \times (1-p_e)$" (step S304). The reliability evaluation apparatus 100 determines whether any edge of information confirmation remains (step S305). When some edge remains (YES at step S305), the reliability evaluation apparatus 100 returns to step S302.

When no edge of information confirmation remains (NO at step S305), the reliability evaluation apparatus 100 calculates T (step S306), and calculates the fraud detection rate D by D=1−B×T (step S307).

As described above, according to the first embodiment, by regarding the application procedure to be evaluated as a network, the reliability of the application procedure is stochastically calculated based on a probability of normal reach from a source to a verification point. Therefore, the application procedure can be quantitatively evaluated in terms of reliability.

While the first embodiment has been described above, the present invention can be embodied in various different modes other than that of the first embodiment. Another embodiment of the present invention is explained as a second embodiment of the present invention.

(1) Reliability of Procedure

In the first embodiment, the reliability of a procedure can be calculated using a probability of selection of a fraud pattern challenged by an applicant. Specifically, a reliability Rel of a procedure can be obtained using the following equation (5) based on a probability S(F) of selection of a fraud pattern F and a detection rate D(F) of the fraud pattern F.

$$\text{Re}l = \sum_{f \subseteq O} S(F)D(F) \quad (5)$$

However, it is usually difficult to determine the probabilities S(F) for all fraud patterns. In realistic ways, the probability S(F) is determined as: S(F)=1/constant of the number of fraud patterns, assuming that selection of a fraud pattern is random, or is approximated based on estimation of a probability of selection among assumed typical fraud patterns. In the random selection, when a fraud has the object as described above, a fraud pattern that cannot achieve the object can be eliminated from options.

(2) System Configuration or the Like

The respective constituent elements of the respective devices shown in the drawings are functionally conceptual, and physically the same configuration is not always necessary. That is, the specific mode of dispersion and integration of the devices is not limited to the shown ones, and all or a part thereof can be functionally or physically dispersed or integrated in an optional unit, according to various kinds of load and the status of use. For example, the pass-rate calculating unit 122 and the fraud-detection-rate calculating unit 123 can be integrated. Further, all or an optional part of respective processing functions performed by the respective devices can be realized by a central processing unit (CPU) and a program analyzed and executed by the CPU, or can be realized as hardware by a wired logic.

Among the respective processes described in the embodiments, all or a part of the processes explained as being performed automatically can be performed manually, or all or a part of the processes explained as being performed manually can be performed automatically by a known method. In addition, the process procedures, control procedures, specific names, and information including various kinds of data and parameters shown in the present specification or the drawings can be optionally changed unless otherwise specified.

(3) Program

The configuration of the reliability evaluation apparatus 100 shown in FIG. 15 can be variously modified without departing from the scope of the present invention. For example, the function of the controller 120 of the reliability evaluation apparatus 100 can be implemented as software. When the software is executed by a computer, a function equivalent to that of the reliability evaluation apparatus 100 can be achieved. An example of the computer that executes a reliability evaluation program 1071 that is software implemented to provide the function of the controller 120 is explained.

Figure 20:
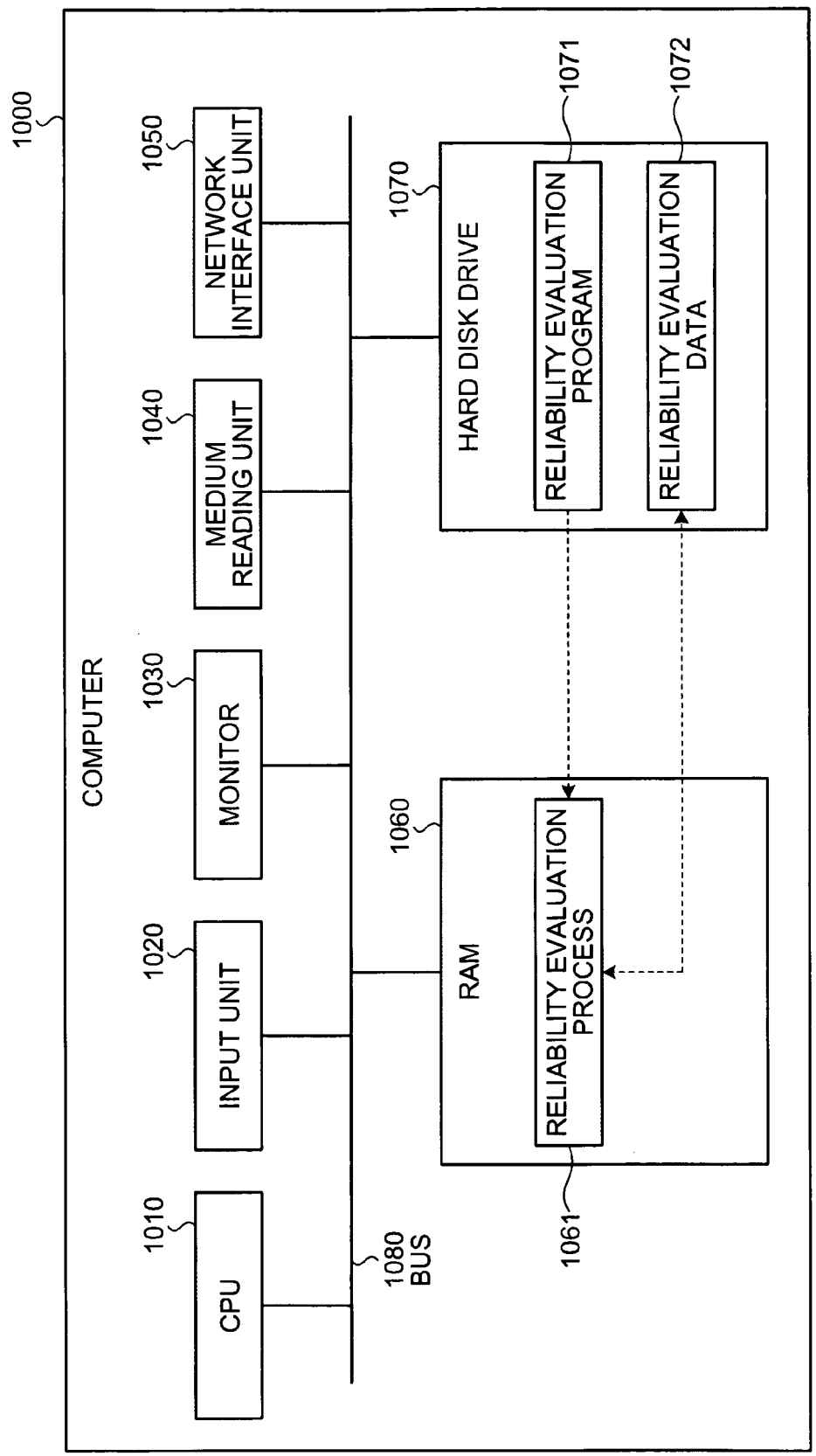
FIG. 20 depicts a computer that executes a reliability evaluation program.

FIG. 20 is a functional block diagram of a computer 1000 that executes the reliability evaluation program 1071. The computer 1000 includes a CPU 1010 that performs various calculation processes, an input unit 1020 that receives input of data from a user, a monitor 1030 that displays various kinds of information, a medium reading unit 1040 that reads programs and the like from a recording medium, a network interface unit 1050 that receives or transmits data from/to other computers through a network, a random access memory (RAM) 1060 that temporarily stores various kinds of information, and a hard disk drive 1070, which are connected by a bus 1080.

The hard disk drive 1070 stores the reliability evaluation program 1071 having the same function as that of the controller 120 shown in FIG. 4, and a reliability evaluation data 1072 corresponding to various data stored in the storage unit 110 shown in FIG. 4. The reliability evaluation data 1072 can be properly distributed and stored in other computers connected through the network.

When the CPU 1010 reads the reliability evaluation program 1071 from the hard disk drive 1070 to expand the program 1071 in the RAM 1060, the reliability evaluation program 1071 works as a reliability evaluation process 1061. The reliability evaluation process 1061 properly expands information and the like, read from the reliability evaluation data 1072, in an area allocated to the process in the RAM 1060, and performs various types of data processing based on the expanded data and the like.

There is no need to always store the reliability evaluation program 1071 in the hard disk drive 1070. The reliability evaluation program 1071 can be stored in a storage medium such as a compact disk read only memory (CD-ROM), and read from the storage medium by the computer 1000 to be executed. The reliability evaluation program 1071 can be stored in other computers (or servers) or the like, connected to the computer 1000 through a public line, the Internet, a local area network (LAN), a wide area network (WAN), or the like, and read from the other computers by the computer 1000 to be executed.

According to the present invention, an application procedure to be evaluated is regarded as a network, and reliability of the application procedure is stochastically calculated based on a probability of normal reach from a source to a verification point. Therefore, the application procedure can be quantitatively evaluated in terms of reliability.

According to the present invention, various simulations or sensibility analyses can be performed using formulas for stochastically calculating the reliability of the application procedure. Therefore, a design or improve operation for securing the reliability in the application procedure can be supported.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer program product having a computer readable medium including programmed instructions for evaluating reliability of an application procedure, wherein the instructions, when executed by a computer, cause a computer to perform:
   reading an action of fact confirmation performed between nodes that are objects relating to fact confirmation in the application procedure, the action being an action of operating information or an action of confirming information, from a storage unit; and
   calculating the reliability of the application procedure, for a fraud that is committed in the action of operating information, the fraud indicating information being fraudulently changed, based on a sum, as a fraud detection rate, of an estimated probability of detection of the fraud in the action of operating information and an estimated probability of detection of the fraud in the action of confirming information performed for a node connected to the action of operating information.

2. The computer program product according to claim 1, wherein a sum of the fraud detection rate and a probability of selection of a fraud is calculated, to calculate the reliability of the application procedure.

3. The computer program product according to claim 1, wherein the instructions further cause the computer to perform simulatively calculating the reliability in the application procedure in such a manner that a given parameter is applied to a computing equation used at the calculating.

4. A method for evaluating reliability of an application procedure, comprising:
   using a processor to perform a process including:
      reading an action of fact confirmation performed between nodes that are objects relating to fact confirmation in the application procedure, the action being an action of operating information or an action of confirming information, from a storage unit; and
      calculating the reliability of the application procedure, for a fraud that is committed in the action of operating information, the fraud indicating information being fraudulently changed, based on a sum, as a fraud detection rate, of an estimated probability of detection of the fraud in the action of operating information and an estimated probability of detection of the fraud in the action of confirming information performed for a node connected to the action of operating information.

5. The method according to claim 4, wherein a sum of the fraud detection rate and a probability of selection of a fraud is calculated, to calculate the reliability of the application procedure.

6. The method according to claim 4, further comprising simulatively calculating the reliability in the application procedure in such a manner that a given parameter is applied to a computing equation used at the calculating.

7. An apparatus for evaluating reliability of an application procedure, comprising:
   a reading unit that reads an action of fact confirmation performed between nodes that are objects relating to fact confirmation in the application procedure, the action being an action of operating information or an action of confirming information, from a storage unit; and
   a reliability calculating unit that calculates the reliability of the application procedure, for a fraud that is committed in the action of operating information, the fraud indicating information being fraudulently changed, based on a sum, as a fraud detection rate, of an estimated probability of detection of the fraud in the action of operating information and an estimated probability of detection of the fraud in the action of confirming information performed for a node connected to the action of operating information.

8. The apparatus according to claim 7, wherein the reliability calculating unit calculates the reliability of the application procedure by calculating a sum of the fraud detection rate and a probability of selection of a fraud.

9. The apparatus according to claim 7, further comprising a simulating unit that simulatively calculates the reliability in the application procedure in such a manner that a given parameter is applied to a computing equation.

\* \* \* \* \*